June 2, 1953　　　M. E. CUSHMAN　　　2,640,555
HYDRAULIC PROPELLER PITCH-CHANGING SYSTEM
Filed March 1, 1946　　　　　　　　　　　　7 Sheets-Sheet 6

INVENTOR.
*Maurice E. Cushman*
BY
*Godfrey B. Speir*
ATTORNEY

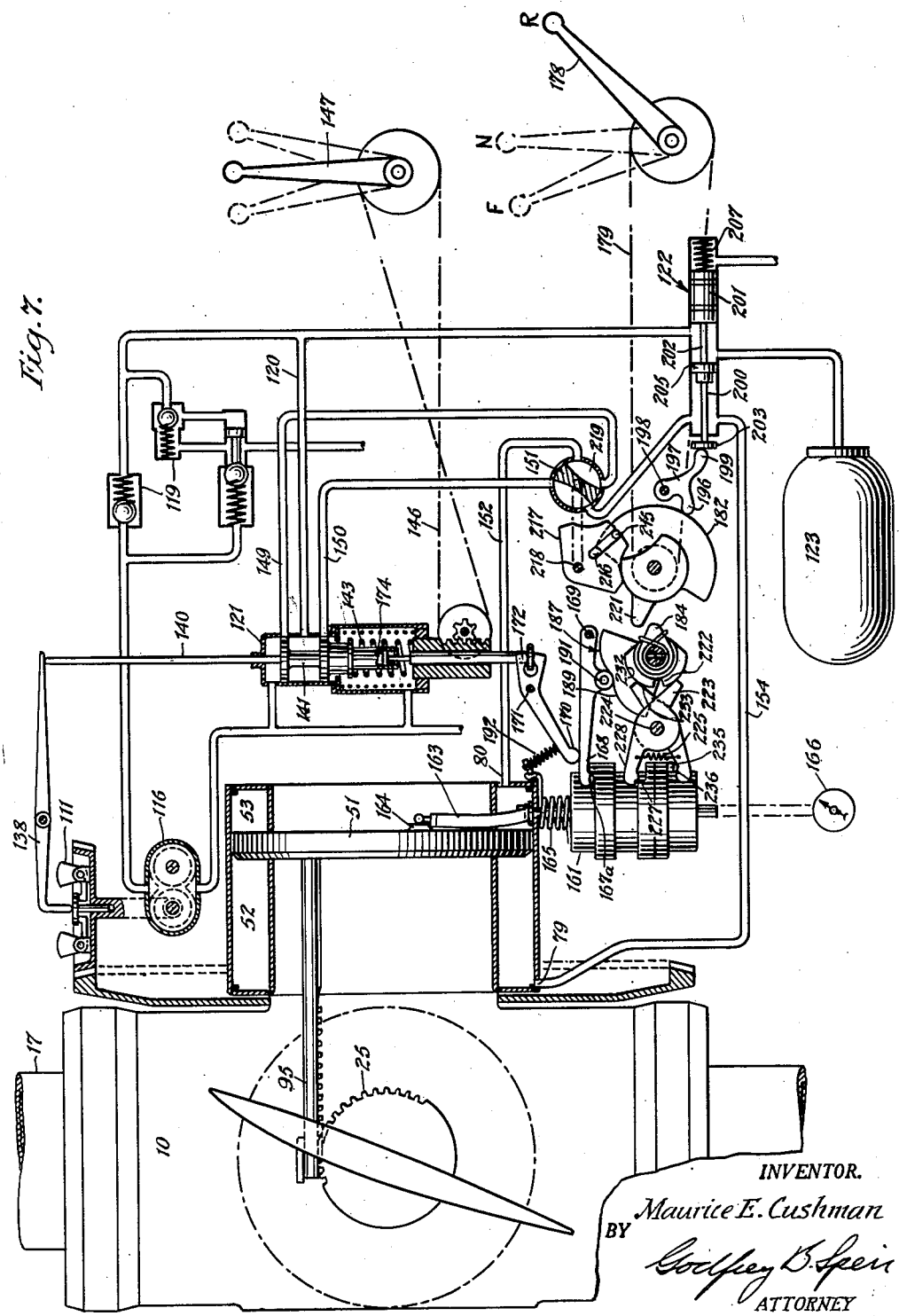

Patented June 2, 1953

2,640,555

UNITED STATES PATENT OFFICE 2,640,555

HYDRAULIC PROPELLER PITCH-CHANGING SYSTEM

Maurice E. Cushman, Verona, N. J., assignor to Curtiss-Wright Corporation, a corporation of Delaware Application March 1, 1946, Serial No. 651,264

5 Claims. (Cl. 170—160.21)

This invention relates to aircraft propellers and is concerned with a novel form of controllable pitch propeller hub and blade organization along with a novel control system for the propeller.

In general terms, the invention includes a propeller blade mounted in such fashion that the centrifugal blade twisting moments tending to turn the blades toward zero pitch position in operation are compensated by the effects of centrifugal force on the blades whereby the effort necessary to turn the blades for pitch change is only that needed to overcome friction and discrepancies in compensation due to manufacturing allowances. The pitch changing motor is hydraulic and by virtue of the small amount of force required to change blade pitch, may operate on hydraulic pressures much lower than those conventional in prior practice. The propeller further includes a simple mechanical control system which permits propeller operation, in the normal governing range, for feathering, and in the reverse pitch range. In addition, the propeller is capable of automatic constant speed governing during reverse pitch operation. A high rate of pitch change is automatically attained when transition from normal pitch range to feathering and reverse pitch is selected, the high rate of pitch change also being automatically attained in the return from reverse pitch operation.

Objects of the invention are (a) to provide a propeller whose control system has full flexibility through a considerable number of different operating ranges; (b) to provide a hydraulic propeller capable of operation at relatively low hydraulic pressures; (c) to provide a propeller which is wholly self-contained so that no special provisions are required in the prime mover for propeller operation or control; (d) to provide a propeller control system wherein a single hydraulic valve is controllable to provide high and low pitch change rates and is influenced by several mechanical controls to fulfill its several operating functions; (e) to provide a highly flexible propeller system which is simple in operation and simple in structure, so that minimum servicing and operational difficulties are likely to be encountered in its use.

The above and additional objects which will become apparent are accomplished by the structure and arrangement set forth in the following detailed description when read in connection with the accompanying drawings. It is to be especially understood, however, that the drawings are merely for the purpose of illustration and are not to be construed as a definition of the limits of the invention, reference being had to the appended claims for this purpose.

In the drawings, wherein like parts are designated by like reference characters, Fig. 1 is a longitudinal section through the propeller hub;

Fig. 7 is a schematic diagram of the propeller control system adjusted for reverse pitch operation.

Figure 1:
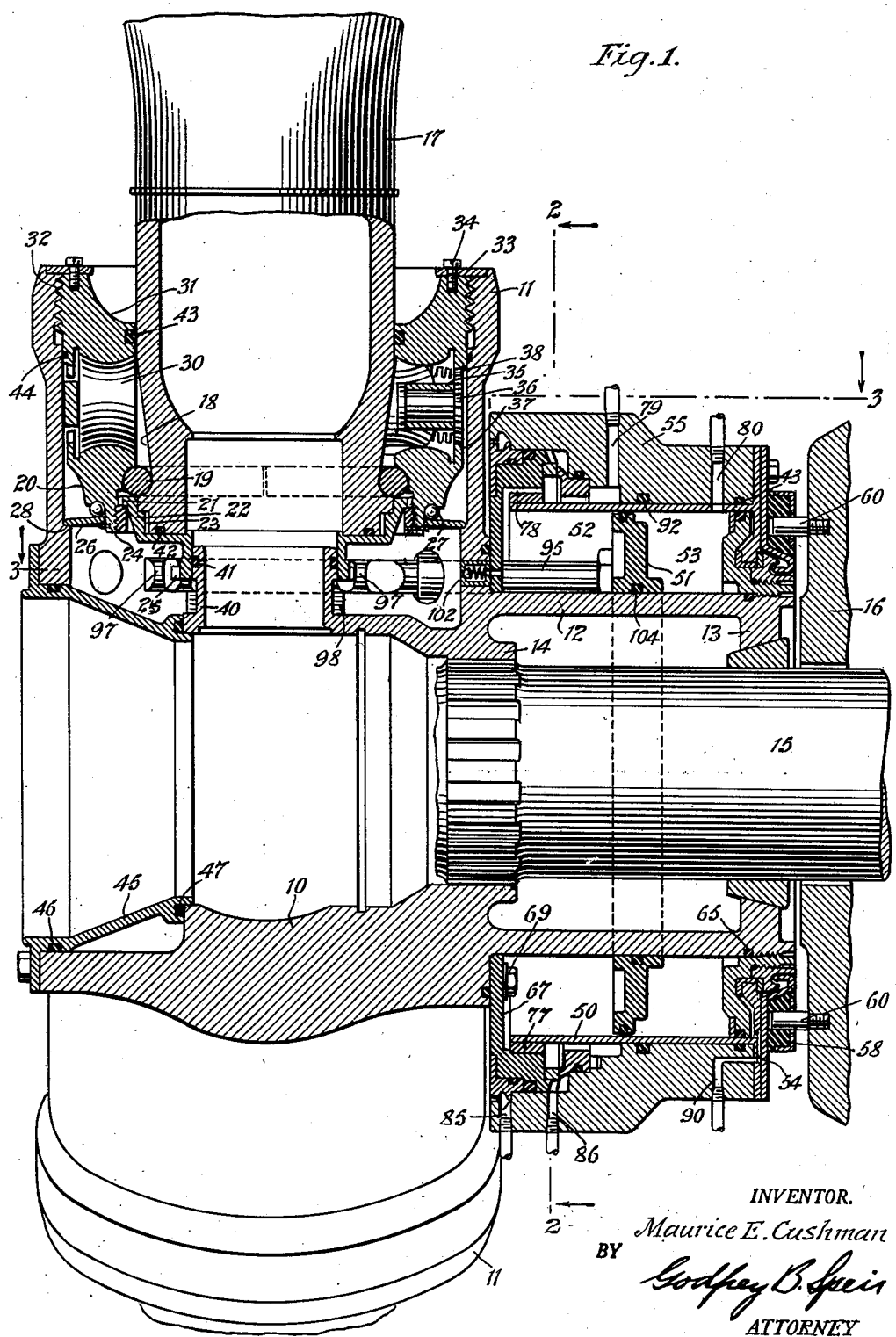
Figure 2:
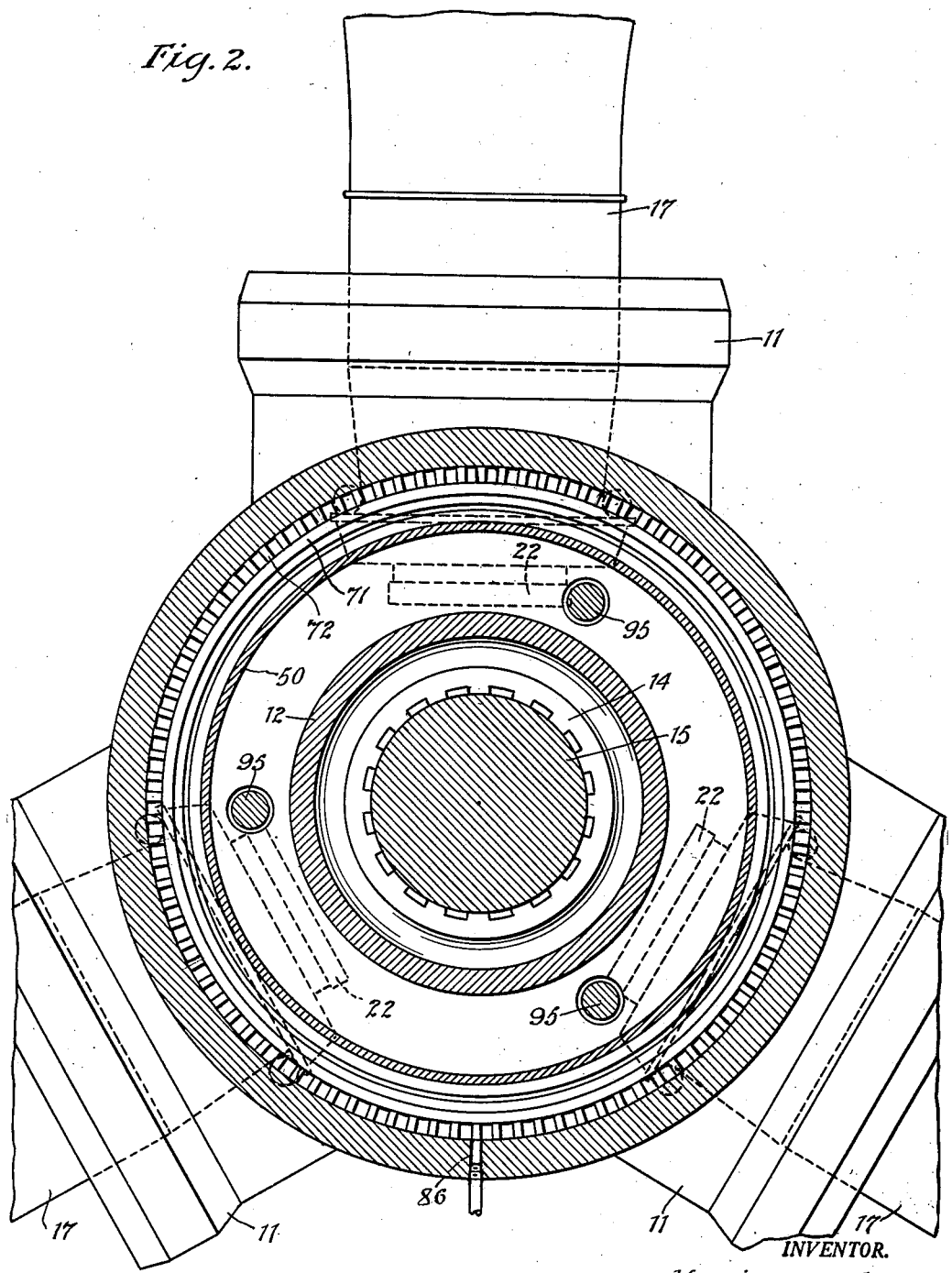
Fig. 2 is a section on the line 2—2 of Fig. 1.

Reference may first be made to Figs. 1 through 4 showing the propeller structure. Therein, a propeller hub 10 is provided with a plurality of blade sockets 11 and with a cylindrical rearward extension 12. This extension provides internal mounting points 13 and 14, the latter comprising a spline connection, for securing the propeller hub to a power shaft 15 extending from the driving end 16 of any suitable prime mover.

Propeller blades 17 of any suitable construction are removably mounted in the blade sockets 11, the butt of each blade having a recess 18 engaged by a pair of half-rings 19 which likewise engage a lower race 20 having a spline connection 21 with an adapter 22, which is splined in turn to the propeller blade butt at 23. The blade, adapter 22, race 20 and split ring 19 are secured together by a nut 24. Loosening of this assembly allows removal of the retaining rings 19 and then removal of the blade 17 from the retaining structure. The adapter 22 carries a spur gear segment 25 (Fig. 3) whose purpose will become apparent. The lower race 20 rests upon a Belleville washer 26 at its inner portion, through a thrust ball bearing 27, the outer rim of the washer 26 resting upon a shoulder 28 formed in the blade socket 11. This washer limits inward blade movement and provides a preload on the blade retention at all times.

The upper surface of the lower race 20 is formed with cam profile as disclosed in my co-pending applications entitled "Variable Pitch Propeller," Serial No. 598,792, filed June 11, 1945, now U. S. Pat. #2,533,358 issued on December 12, 1950, and Serial No. 598,791, filed June 11, 1945, now U. S. Patent No. 2,514,477 issued on July 11, 1950. A plurality of rollers 30 bear upon the upper surface of the lower race 20, and these rollers in turn engage an upper race 31 also having cam profile in accordance with teachings of said applications, which is screwed as at 32 into the outboard end of the blade socket 11, the race 31 being secured from rotation in the socket by lock keys 33 fastened by screws 34. The rollers 30 are held in a cage 35 whose motion relative to the races 20 and 31 is controlled by pinions 36 meshed with gears 37 and 38 formed respectively on the outer edges of the races 20 and 31. The cams and rollers above mentioned are so constructed as to provide a twisting moment on each propeller blade shank equal and opposite to the twisting moment resulting from the outer portions of the propeller blade which tend in operation, in a manner well known in the art, to move toward a flat pitch position.

In the blade and hub construction above described, the propeller blade 17 will have a slight radial movement with respect to the propeller hub during pitch change and this radial movement results in varying deflections in the Belleville washer 26. With the indicated radial movement, the spur gear 25 also moves.

To provide for sealing within the blade socket, a member 40 is formed in the propeller hub whose outer end loosely engages the bore of the adapter 22, and is sealed thereto by a ring seal 41. Ring seals 42, 43 and 44 are further provided in the hub structure to eliminate fluid leakage from the hub. The seal 43 is of such character as to permit pitch changing rotation of the propeller blade 17 with respect to the upper race 31 without loss of fluid within the hub.

The front end of the propeller hub is provided with a closure 45 sealed as at 46 and 47 to the hub, the opening through the element 45 permitting free passage from the front of the hub into the hollows of the propeller blades should the propeller system be equipped with a hot gas de-icing system. The opening through the element 45 further provides access to the propeller hub lock nut assembly, not shown, by which the propeller hub is secured to the prime mover shaft 15.

Embracing the rear cylindrical extension 12 on the propeller hub is a cylinder 50, there being an annular cylindrical space between the extension 12 and the cylinder 50. Within this annular space is an annular piston 51, capable of longitudinal sliding movement between the elements 12 and 50. This piston defines forward and rearward annular spaces 52 and 53 respectively whose purpose will shortly become apparent. The cylinder 50 is stationary—that is, it does not rotate with the propeller. To hold it from rotation, the rearward end of the cylinder 50 is provided with a flange 54 secured to a cylinder-embracing housing 55 and to a reaction plate 56 by screws 57. The plate 56 carries a rubber ring 58 having openings 59 engageable with dowels 60 secured to the prime mover nose 16.

An inner projection of the cylinder plate 54 as at 61 is secured between a rear cylinder closure 62 and a mating nut 63, both of which are secured to the hub extension 12 as at 64, so that the cylinder 50 and all elements carried thereby are held in fixed axial relationship with respect to the propeller hub. This assembly also provides a rear radial bearing to support the housing 55 on the extension 12. Thus, upon removal of the propeller from the engine shaft, the entire cylinder and housing assembly including the elements 50 and 55 will be removed with the hub, the rubber ring 58 merely slipping from the dowels 60. Also, during propeller operation, the fixed and rotating parts of the propeller are held in fixed axial relationship.

The closure 62 is sealed to the hub extension 12 by a ring seal 65.

The hub 10 at the front end of the extension 12 carries a plate 67 which is sealed to the hub by a ring 68 and is secured to it by screws 69. Said plate forms a forward closure for the annular space 52. Said plate includes a rearwardly extending flange 70 which carries a metallic seal ring 71 bonded thereto and integral bevel gear 72. Engaged with the ring seal 71 is a stationary coacting seal ring 73 slidably fitted to a recess 74 in the housing 55, said ring 73 having a resilient sealing annulus 75 engaging the recess 74, and said seal ring 73 being urged axially into contacting engagement with the ring 71 by a wave spring 76 between the ring 73 and the housing 55. Thus, the annular contact surface between the rings 71 and 73 provide a rotating seal capable of sustaining hydraulic pressure without substantial leakage. A bushing 77 is fitted to the flange 70 to provide a radial bearing for the forward end of the cylinder 50, supporting the latter and the housing 55.

A passage 78 around the bushing 77 leads from the forward annular cavity 52 to the clearance space between the cylinder 50 and the ring seal assembly just described and this passage communicates as shown in Fig. 1, with a fluid feed passage 79 which serves as an entrance and exit for fluid flowing to and from the forward annular cavity 52. The rear annular cavity 53 receives and discharges hydraulic fluid through a passage 80 shown in Fig. 1 formed in the housing 55 and in the cylinder 50.

In addition to the rotating seal provided between rings 71 and 73, additional sealing provisions are incorporated in the hub end of the piston-cylinder assembly, these including a seal ring 82 disposed between the housing 55 and the plate flange 70, and secured in position in the plate flange 70 by a fitting 83 secured to the plate flange. A recess 84 is defined between the fitting 83 and the housing 55 which accumulates minor leakage from the rotating seals 71, 73 and 82 whence leakage fluid is returned to a fluid sump, not shown, through a duct 85. Between the ring seal 71—73 and the ring seal 82 the housing 55 is provided with a drain duct 86 which returns leaked fluid to the sump.

At the rearward end of the piston-cylinder assembly the closure 62 is provided at its outer rim with a piston ring seal 88 disposed in a groove 89 in the closure. This ring normally bears upon the inner surface of the cylinder 50, but is free to move axially relative thereto. Rotating engagement will occur between the ring 88 and the surfaces of the recess 89 and this arrangement will provide a primary seal for fluid within the annular cavity 53. Such fluid as may leak past the seal 88 will be returned to the sump through a passage 90, (Fig. 1). Some fluid will reach the axial restraint structure involving the elements 61, 62 and 63 and any fluid leaking past this structure will be returned to the sump through the drain passage 91 shown in Fig. 4.

As will be noted in Fig. 1, the oil feed passages 79 and 80 to the cylinder 50 pass through the housing 55. This housing may have slight clearance relation with respect to the exterior surface of the cylinder 50 and accordingly, seal rings 92 and 93 are provided between the housing 55 and the cylinder 50 to prevent interflow of pressure fluid between the passages 79 and 80 and to prevent leakage of fluid from the passage 80 to the exterior of the housing structure.

Figure 3:
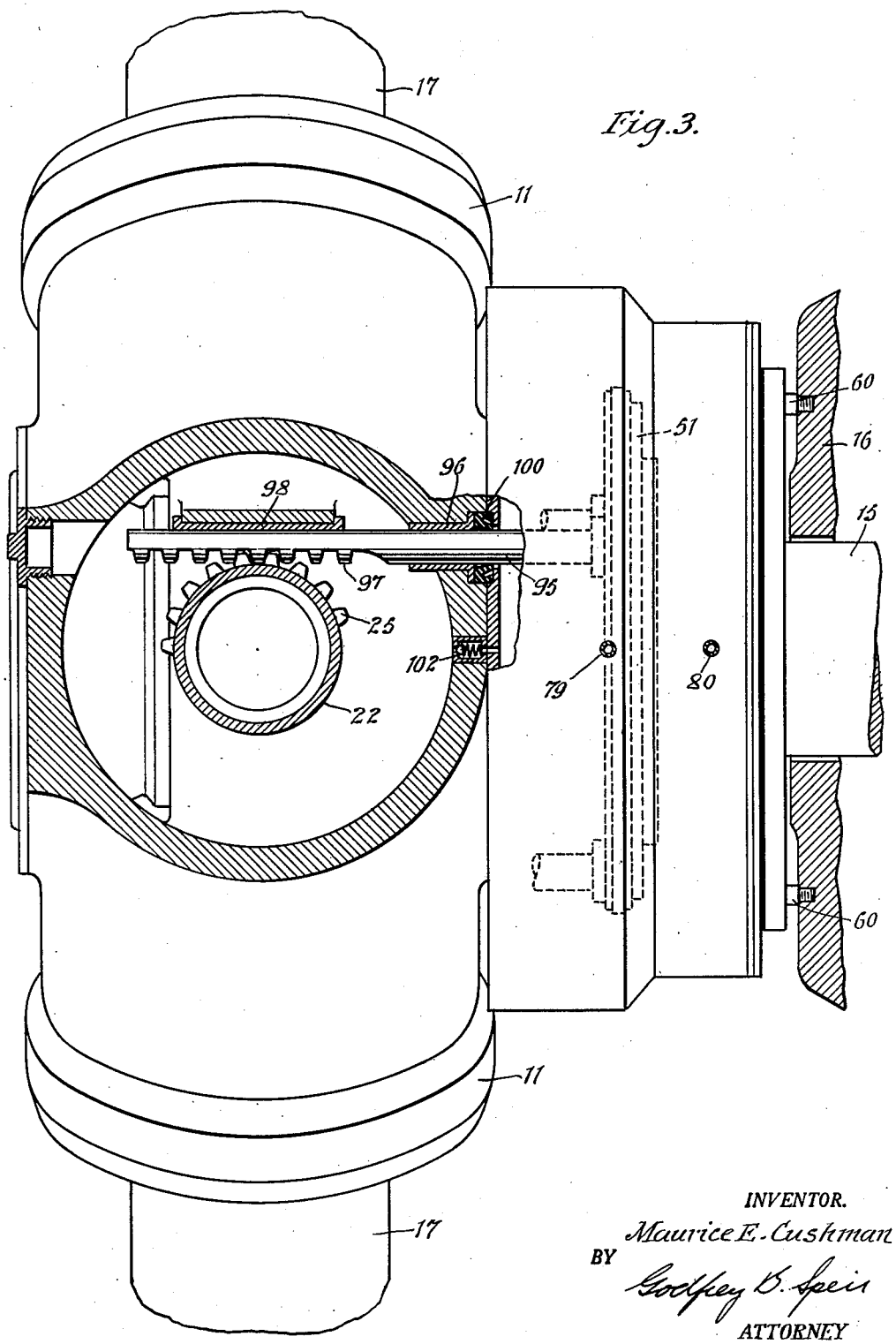
Fig. 3 is a section on the line 3—3 of Fig. 1.

Referring now to Figs. 1 and 3, means are shown by which axial movement of the piston 51, under the influence of hydraulic pressure on either side of the piston, causes propeller blade pitch change. The piston 51 has adjustably secured thereto a number of rods 95 equal to the number of propeller blades. Each of these rods projects forwardly through an opening in the rear wall of the propeller hub as at 96 and is formed, at its forward end, as a gear rack 97 engaging the spur gear 25 secured to the blade butt. Opposite the engagement of the rack teeth with the gear 25, a back-up bearing 98 is provided in the hub structure, this bearing serving to hold the rack teeth in close engagement with the gear teeth to prevent backlash and bending of the piston rod.

In its passage through the rear wall of the propeller hub, the piston rod 95 is provided with a packing 100 to suppress excess leakage of hydraulic fluid from the annular cavity 52 into the propeller hub proper. The hub, being sealed by the various seal rings and packings previously mentioned, is intended to operate substantially full of oil. When the hub is full of oil, and should the piston 51 be in a right-hand position as shown in the drawings, there will be maximum volumetric space in the hub, which is filled with oil. Now, if the piston should be moved leftwardly, the piston rods 95 will occupy some of the free space within the hub and will displace fluid therefrom. To provide for bleed of such fluid from the hub, a check valve 102 is provided which will allow outflow of oil from the hub to the annular cavity 52. It will be apparent that upon piston movement to the left, pressure will be on the right side of the piston 51 so that the annular cavity 52 is in an unpressurized condition. If rightward movement of the annular piston 51 is enforced by applying fluid pressure in the annular cavity 52, the check valve 102 will close, the piston rods will be withdrawn to some extent from the hub interior, and some additional clearance space will then be provided within the hub which in due course, may receive oil leakage from the annular cavity 52 through the seals 100.

Figure 4:
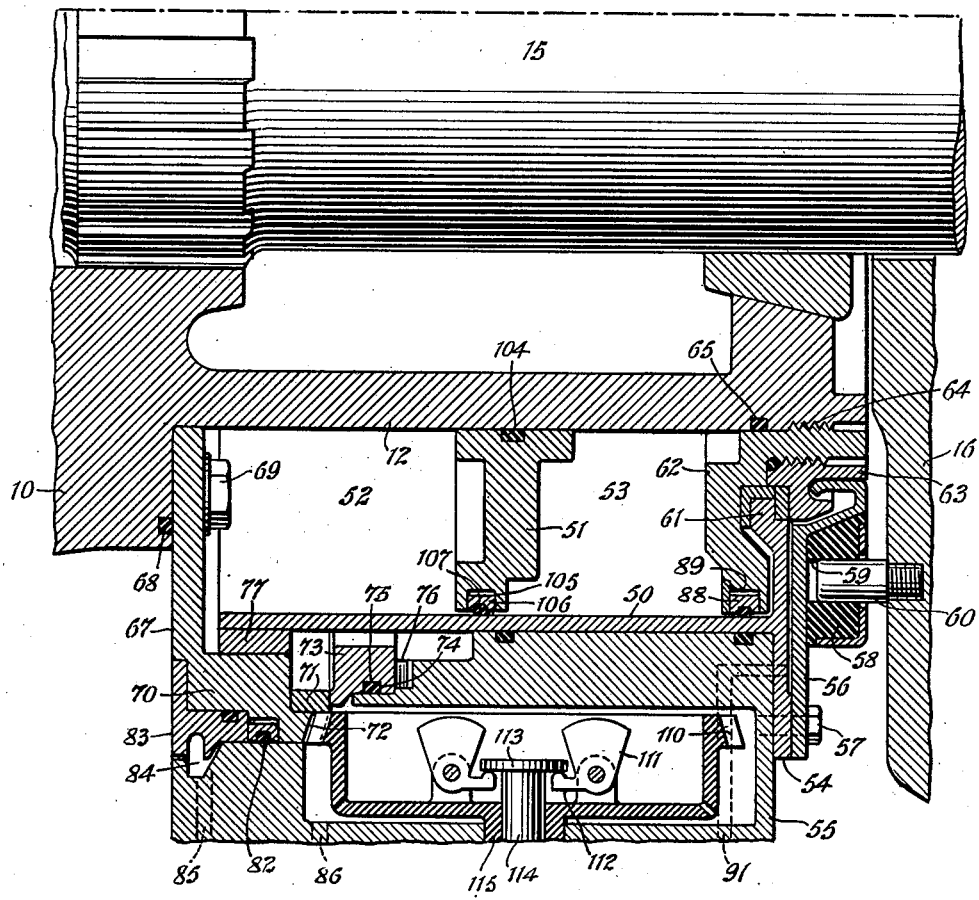
Fig. 4 is an enlarged fragmentary view of a portion of the pitch changing mechanism.

Regarding the piston 51, a seal ring packing 104 is provided in its bore, for sliding and sealing engagement with the outside of the cylindrical portion of the hub (12). The piston slides but does not rotate with respect to this cylindrical hub portion. The outer rim of the piston as best shown in Fig. 4, is provided with a piston ring groove 105 to which is fitted a split piston ring 106 which springs outwardly into engagement with the cylinder 50 for sealing engagement therewith. This piston ring may have a non-metallic seal ring 107 set into an appropriate groove in its outer surface. Since the cylinder 50 is stationary, and since the piston 51 and the cylinder 12 rotate, the piston ring 106 will have non-rotating sliding engagement with the wall of the cylinder 50 and relative rotation will occur between the piston ring and the piston 51. The sealing surfaces will be the side walls of the piston ring 106 and the side walls of the groove 105 in the piston.

Summarizing the operation of the structure thus far described, the cylinder 50 and the housing 55 secured thereto are held stationary by the engine nose dowels 60, while the propeller hub, the extension 12, and the piston 51 rotate as a unit. Upon admission of pressure fluid to the rear annular space 53 through the passage 80, the piston 51 will be moved forwardly, and the several racks 97 will thus cause anti-clockwise movement of the propeller blade about their own axes, moving the propeller blades into a high pitch position. If the movement is carried to completion, the piston 51 will abut the plate 67 secured to the propeller hub and coincidentally the blades will be positioned for feathering. Precise adjustment of the blade feathering angle is effected by shimming the inside of the plate 67 to establish the end position of piston travel.

If pressure fluid is admitted to the forward annular space 52 from the passage 79, the piston 51 is moved rearwardly causing pitch decreasing movement of the propeller blades. In the embodiment shown, the range of pitch angle adjustment of the propeller blades is approximately 120 degrees, allowing a full 90 degrees of positive pitch positioning of the blades, and 30 degrees of negative pitch positioning of the blades. When the piston 51 is in its rearward-most position, the propeller blades will be in negative or reverse pitch position.

Should a propeller be desired with the pitch changing range limited to high and low pitch respectively less than 90 degrees positive pitch and more than zero pitch, the extension 12 and its associated structure may be shortened, and a different means may be used for translating movements of the piston 51 to blade pitch change. For instance, connecting rods pivoted to the blade butts and piston rods, or slotted bars on the piston rods engaging pins on the blade butts, could replace the rack 97 and the gear 25. In the propeller described, relatively low hydraulic pressures are needed to cause blade pitch changes even at a high rate, due to compensation of blade centrifugal twisting forces. Such pressures may reach a maximum of 600 p. s. i. but normally will be much lower. When not changing pitch, fluid pressure in the propeller actuating cylinder will be very low.

While any suitable means may be used to control the application of pressure fluid to the passages 79 or 80 in the fixed housing 55, to effect the desired range of blade pitch changes or to effect governing of the propeller blade pitch, I have shown one embodiment of a pitch control system to allow highly flexible propeller pitch control under various conditions of propeller operation. Such a control system is shown in Figs. 5, 6 and 7.

Figure 5:
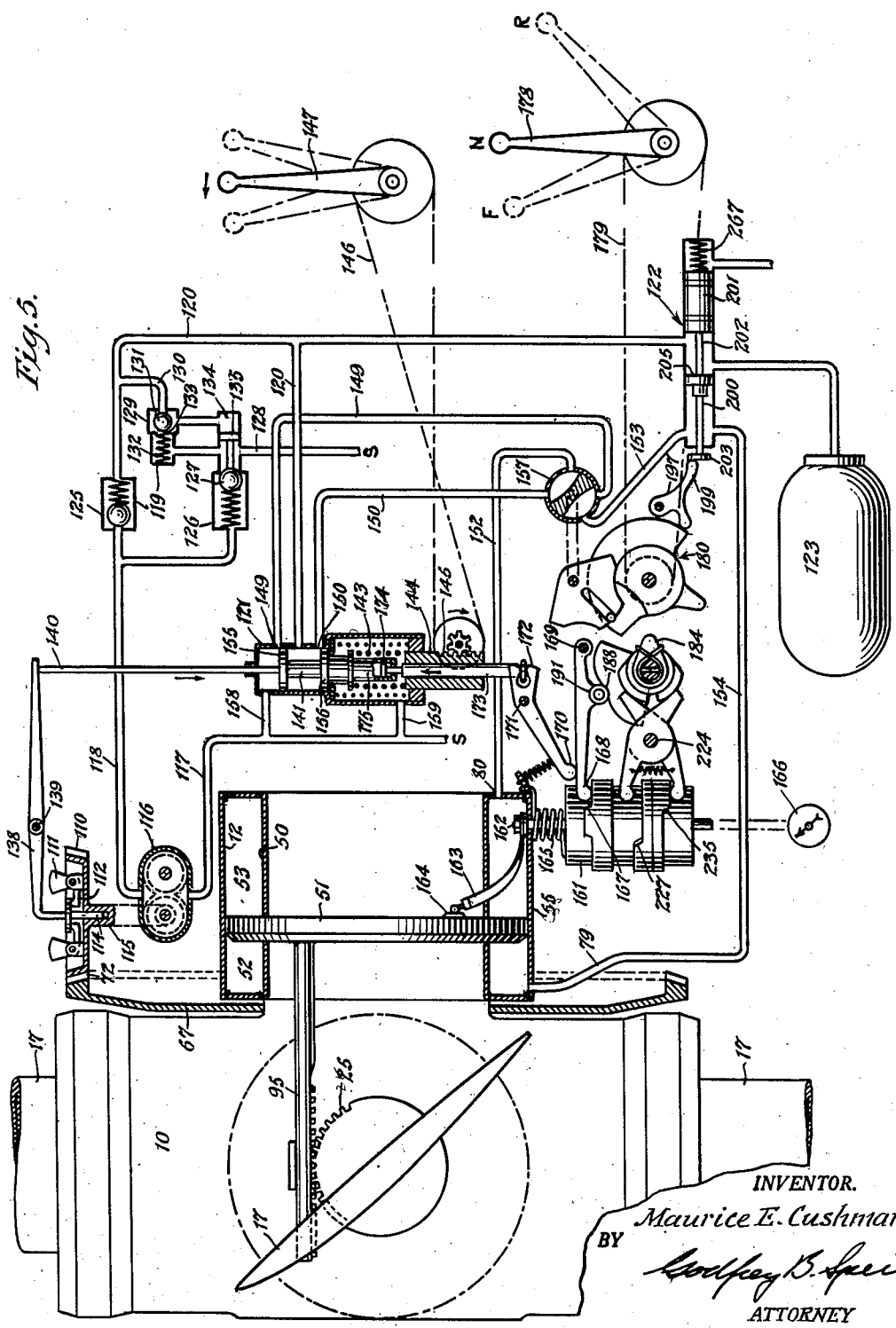
Fig. 5 is a schematic diagram showing the propeller control system adjusted for normal governed propeller operation.
Figure 6:
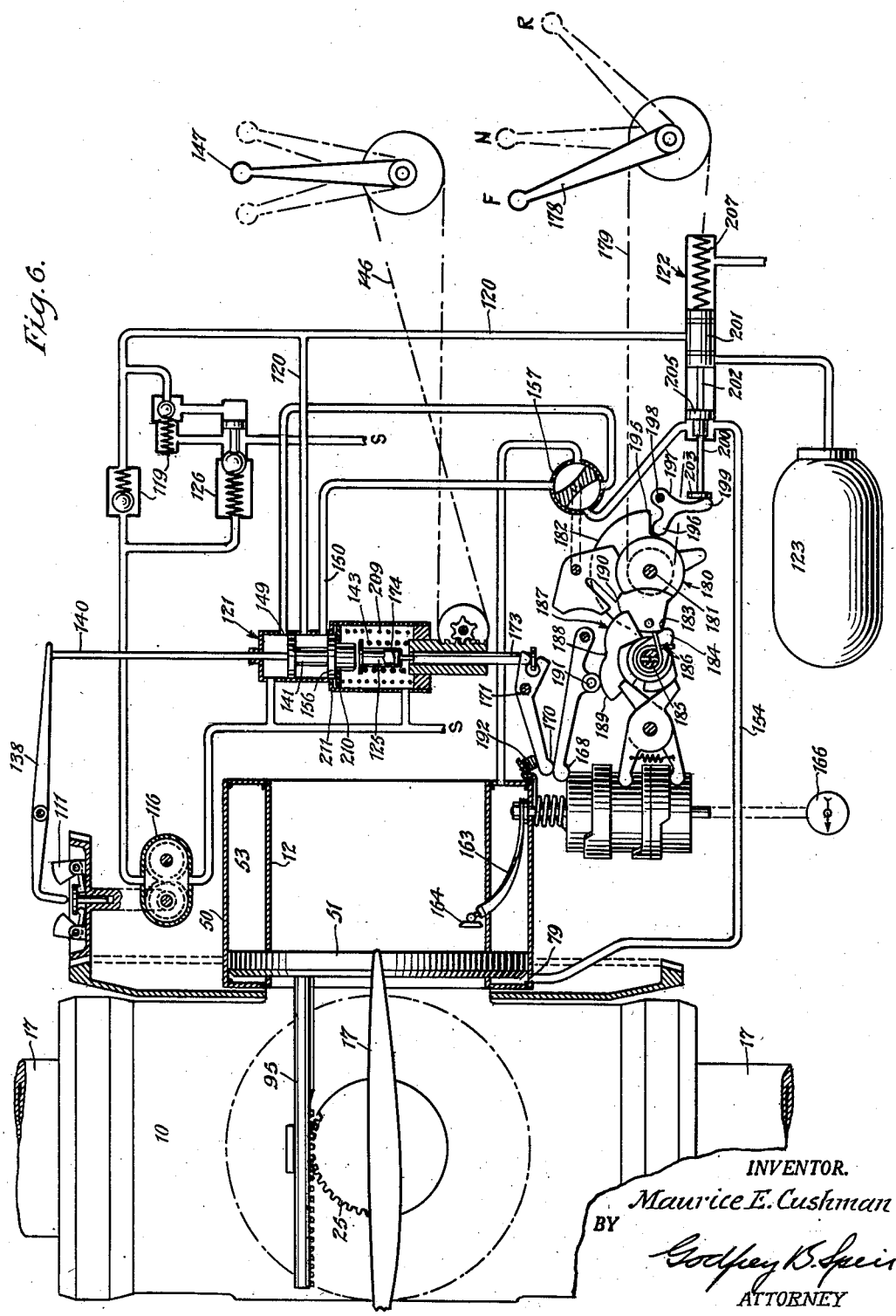
Fig. 6 is a schematic diagram showing the propeller and controls in the feathering position.

Fig. 5 shows the essential elements of the control system, and the system adjusted for normal automatic governing operation of the propeller. The gear 72 rotating with the propeller drives a bevel pinion 110, the hub of which is formed as a cup to contain a plurality of flyweights 111 pivoted on axes parallel to tangents to the pinion so that they may swing inwardly and outwardly in response to speed changes of the propeller. Each flyweight carries an arm 112 which bears upon a flange 113 of the plunger 114 piloted in the shaft 115 of the pinion. As schematically shown, the pinion shaft 115 drives a pump 116, preferably of gear type, which is fed from a pipe 117 leading to a sump, not shown. Pressure fluid delivered by the pump 116 while the latter is rotating due to propeller rotation is delivered to a pipe 118. The pipe 118 leads to an unloader valve assembly 119 and thence through a pipe 120 to the central portion of a valve body 121. The pipe 120 also leads through a cutoff valve 122 to an accumulator or air bell 123.

The unloader valve assembly 119 includes a check valve 125 permitting fluid flow from the pump to the line 120. An additional valve 126 is connected to the line 118 and when the valve element 127 is off its seat, fluid delivered by the pump is dumped to the sump through the line 128. A differential pressure valve 129 is fed from the line 120 as at 130, the line 130 normally being closed by the valve 131 backed up by a spring 132. When pressure in the line 130 is sufficient, the valve 131 will move from its seat, against the spring 132, said valve seating on a larger diameter seat as at 133. Thereupon, fluid pressure in the line 120 is transmitted to a small cylinder 134, containing a piston 135 which may move leftwardly to open the valve 126. The valve 131, in seating against the seat 133, prevents loss of fluid from the line 120 to the sump. When the pressure in the line 120 drops to a value less than the unit pressure determined by the load of the spring 132 and area of the valve seat 133, the valve 131 will move to the right to seal the pipe 130. Then the cylinder 134 will unload to the sump, the valve 127 will close, and the pump 116 will again be pressure loaded to provide fluid to the system. This unloading system, just described, serves in conjunction with the accumulator 123, to maintain fluid pressure in the line 120 but allows the pump 116 to be unloaded when fluid demand is not present or when the accumulator 123 can supply the fluid demand.

The flange 113 of the flyweight governor forms an abutment for one end of a lever 138, fixedly pivoted at 139, the other end of the lever bearing on a stem 140 which enters the valve housing 121, said stem bearing downwardly upon a valve 141 within the body. The downward pressure exerted by the stem 140 is a function of the R. P. M. of the propeller, and in normal governing operation is counteracted by a speeder spring 143 bearing upwardly upon the bottom of the valve 141. The force exerted by the speeder spring is adjustable through an abutment 144 carrying a rack 145, the abutment 144 being moved axially by a cable or other suitable connection 146 connecting the rack pinion to a speed adjusting control 147. If the control 147 is moved leftwardly as shown, the abutment 144 will be raised, compressing the spring 143, raising the valve 141 and the stem 140. As propeller speed increases, a balancing force from the governor will neutralize the position of the valve 141.

The valve body 121 is provided with axially spaced ports 149 and 150, connected respectively by pipes bearing the same numbers to a flow reversing valve 151. In the normal automatic governing position shown in Fig. 5, a pipe 152 communicates with a pipe 150 and with the passage 80 in the propeller annular cylinder, permitting hydraulic fluid to pass to the annular space 53. The pipe 149 in the normal position shown connects with a pipe 153 leading to the leftward end of the accumulator valve 122 and thence through a pipe 154 through the passage 79 connecting with the annular space 52 in the propeller operating cylinder.

The valve stem 141 is provided with flanges 155 and 156 so spaced that they may cover the valve body ports 149 and 150. In the position shown, these flanges are lowered with respect to said port permitting flow of pressure fluid from the line 120 to the lines 150 and 152, so that the fluid may enter the annular space 53 to cause increase in pitch of the propeller. In this position of adjustment, the flange 155 uncovers the port 149 so that fluid in the annular space 52 of the propeller passes through the several pipes 154, 153 and 149 to a dump pipe 158 connected to the sump indicated by the letter S. This position of adjustment represents a demand by the governor for increasing propeller pitch. If the governor demand indicates a need for decreased propeller pitch, the valve 141 will raise to a position where the pressure line 120 connects to the line 149, and where the annular space 53 connects, through the lines 152 and 150, to the sump, through a dump pipe 159.

If transient changes occur in propeller R. P. M., the flyball governor assembly in the pinion 110 wil effect hydraulic control of the propeller toward increased or decreased pitch positions to bring R. P. M. of the propeller to an equilibrium condition. If purposeful changes are made in the R. P. M. setting desired, by manipulation of the control 147, the valve 141 will vary in position to allow increase or decrease of propeller pitch to the newly set R. P. M., culminating in balance of forces between the speeder spring 143 and that exerted through the stem 140 by the flyweight action of the governor.

There is no provision for a high pitch limit in the propeller during normal governing operation. There is provision for a normal low pitch limit, incorporated in a cam cylinder 161 secured within the stationary housing 55 and turned, through a shaft 162, by a flexible strap 163 having a shoe 164 bearing at times upon the rear face of the annular piston 51. A torsion spring 165 is provided to urge the cam cylinder 161 in a direction to enforce strap movement toward the piston and the position of the cylinder 161 is established by the abutment of the shoe 164 on the piston 51. A connection may be made if desired from the cylinder 161 to a pitch indicator 166 so that the operator may note at any time the pitch position of the blades. Such an indicator may also be used to operate auxiliary controls requiring pitch sensing devices. If the piston moves to the rear as shown in Fig. 5, the cylinder 161 will be turned so that a cam lobe 167 thereon engages a follower 168 having a fixed pivot 169. As the propeller approaches low pitch, the cam 167 will raise the follower 168. This, in turn, raises a lever 170, fixedly pivoted at 171, and causes the right hand end 172 of the follower to descend. This follower end 172 is engaged with a pull rod 173 passing through the speeder spring abutment 144 to a button 174 engageable at times with a thimble 175 which forms the top abutment for the speeder spring 143 and which further bears upon the valve 141. As the cam 167 raises the follower 168, the speeder spring, through the mechanism just described will be retracted, to the amount necessary to cut off fluid flow to the port 149, preventing further pitch change in the low pitch direction.

If increased pitch (or decreased R. P. M.) is called for by the governor flyweight, the valve 141 will descend with respect to the button 174 under the influence of the force from the governor, permitting pressure fluid to pass to the propeller cylinder annular space 53 for pitch increase. As pitch increases, the effect of the low pitch cam 167 drops out and the propeller resumes normal governed operation.

Now, reference may be made to Fig. 6 which shows the position of adjustment of the system for propeller feathering. Selection of propeller feathering is made by a control 178 which is moved forwardly to the feather position (F)

from the prior normal position (N). Through a mechanical connection such as a cable 179, the control 178 moves a member 180, fixedly pivoted at 181 to the stationary housing 55, in a counter-clockwise direction. The member 180 carries a disc segment 182 having a shoulder 183 which will be turned by manipulation of the control to engage a finger 184, turning the finger in a clockwise direction about its fixed pivot 185 and against a centering spring 186. This spring holds the finger 184 in a normally horizontal position, but allows it to be tilted up or down by the shoulder or by other means to be described. To the finger 184 is secured a cam 187 having a central low point 188 bordered by high points 189 and 190. The cam follower 168 has a roller follower 191 normally bearing upon the cam 187. In the normal central position of the adjustment of the finger 184, shown in Fig. 5, the roller 191 rests upon the low point 188 of the cam but in the feather position, when the finger 184 is depressed, the roller 191 raises to the high point 189 of the cam. With this movement the follower 168 raises the member 170 against a return spring 192 and enforces downward movement of the stem 173 and the button 174. With this action, the speeder spring 143 is compressed, retracting the thimble 175 clear of the valve 141. This allows the valve 141 to drop, connecting the fluid pressure line 120 to effect pitch increase of the propeller at a high rate of change, by passing fluid to the annular space 53. There being no normal high pitch limit stop, the piston 51 will move leftwardly to increase propeller blade pitch until the piston 51 abuts the front end of the annular cylinder formed by the elements 12 and 50. The relationship of the piston rod 95 to propeller blade angle is so adjusted that the propeller blade will be in a full feathering position as shown when the piston abuts the cylinder.

When the control 178 is moved to the feather position, the disc segment 182 was moved counter-clockwise and another shoulder 195 moved away from an arm 196 of a bellcrank having a fixed pivot 198. The other arm 199 of the bellcrank moved away from a plunger 200 associated with the accumulator shut-off valve 122. This valve comprises a body having central ports with which the pipe 120 and the pipe leading from the accumulator 123 communicate. A piston 201 is slidable in the valve body from a position such as is shown in Fig. 5 where the pipe 120 and the accumulator are open to each other, to a position shown in Fig. 6 where the pipe 120 and the accumulator pipe are sealed off. The piston 201 is operated by a plunger 202 having an operating button 203 at its left hand end for engagement by the arm 199 of the bellcrank 197. The plunger 202 has a secondary piston 205 between the accumulator port and the left end of the valve body, said left end being ported to receive the pipe 154 from the front end of the propeller operating cylinder and the pipe joining the valve 122 with the reversing valve 151. In the normal position, the plunger 202 is held in a rightward position by the bellcrank 197. When the control 178 is moved to feathering position, the bellcrank moves away from the plunger button 203 so that the latter is free to move to the left under the influence of a light spring 207. During the feathering cycle, fluid in the annular space 52 of the propeller operating cylinder is driven from it, through the pipe 154 and through the left end of the valve 122. While fluid is flowing there will be back pressure due to line drop between the valve 122 and the sump, exerted against the left side of the piston 205, holding the plunger 202 and the piston 201 in the right hand position. As the propeller blades approach the feathering position, the rotational speed of the propeller diminishes with attendant slow down in delivery from the gear pump 116. As the pump output diminishes, the pressure available in the accumulator will provide the power for completing the feathering cycle, by delivering fluid to the pressure line 120. As the propeller blades reach the feathered position, flow of liquid from the annular cavity 52 will cease and pressure in the line 154 will accordingly drop off to a negligible value. Thereupon, the spring 207 will move the piston 201 leftwardly, since the bellcrank 197 no longer holds the plunger 202, and the accumulator will be sealed off by the piston 201. At this point, the whole system becomes static.

During the feathering cycle, propeller pitch change at a very high rate is accomplished since the speeder spring 143 has been retracted and a full opening of the ports 149 and 150 is permitted. To afford a uniform high rate of propeller feathering, the valve body 121 is provided with an auxiliary spring 209 having a fixed abutment at its lower end and bearing on a washer 210 at its upper end. The washer has an upwardly limited movement established by a shoulder 211 in the valve body 121 which is so placed that when the valve flange 156 rests against the top of the washer 210, the port 150 will be partly open. With the speeder spring retracted, further downward movement of the valve 141 can be affected, and the opening of the port 150 can be increased by the valve flange 156 bearing down on the auxiliary spring 209. Such movement will be roughly proportional to the downward force on the valve 141 which is a function of propeller speed. With variations in this force, the valve 141 may move slightly up and down, altering the area of the port 150 to provide pressure on the downstream side thereof which will be sufficient to maintain a constant high rate of pitch change.

When unfeathering is desired the control 178 is moved from the feathering position to the normal position (N). This action turns the disc segment 182 in a clockwise direction, permitting the finger 184 to resume its normal horizontal position. This places the roller 191 in the low notch 188 of the cam 187, releasing the governor valve speeder spring 143 so that it may influence the valve 141. Concurrently, the bellcrank 197 will be turned counter-clockwise, the crank arm 199 pressing on the button 203 and forcing the piston 201 to a rightward position against the spring 207. Thereupon, pressure fluid from the accumulator 123 is admitted to the pressure line 120 so that it may enter the valve housing 121. Since the propeller is stopped, there is no downward force from the governor on the stem 140, and the speeder spring 143 is pressing the valve 141 upwardly. Thus, the pressure line 120 is placed in communication with the port 149 and pressure fluid flows therethrough, through the reversing valve 151, the accumulator valve 122, the pipe 154, to the passage 79 and the annular space 52 forward of the propeller piston 51. This causes rearward motion of the piston and movement of the propeller blade toward a low pitch position. The propeller will then begin to windmill and as it picks up speed, the gear pump 116 will begin to develop pressure to carry on the unfeathering operation until the system resumes its normal mode of operation for automatic speed governing, as previously described in connection with Fig. 5.

Fig. 7 shows the control system in one of the phases of reverse propeller pitch operation. As is known in the art, reversal of propeller pitch is useful to provide aerodynamic braking of an aircraft, either during landing operations or for dive braking. A prime requirement for propeller pitch reversal is to have a very high rate of pitch change from normal to reverse pitch and from reverse pitch to normal so that engine overspeeding will not occur due to windmilling action, or due to a power-on condition of the engine while it has little or no propeller load.

When the control 178 is moved to the rear, to the reverse pitch position (R), the disc segment 182 is rotated in a clockwise direction from normal about 90 degrees. A pin 215 on the disc 182 engages a slot 216 in a plate 217 having a fixed pivot 218. As the disc 182 turns, the pin swings the plate 217 through approximately 90 degrees and by its direct connection with a rotor 219 of the reversing valve 151, the valve position is altered. Thereupon, the pipe 149 from the governor valve 121 is connected through the pipe 152 and the passage 80 to the annular space 53 in the rear end of the propeller cylinder. The pipe 150 is connected through the pipe 154 and the passage 79 to the annular space 52 at the front end of the propeller cylinder.

In turning clockwise as above described, the disc 182 carries a projection 221 co-planar with the finger 184. As the disc 182 turns, the projection engages the finger 184 moving it upwardly approximately 45 degrees. When so moved, a dog 222, rotatable with the finger, is engaged by a pawl 223, the pawl being mounted on a fixed pivot 224 and being urged into engagement with the dog 222 by a spring 225. This action locks the finger 184 in the upwardly tilted position, after the projection 221 has passed beyond the finger. With the finger turned from the horizontal position, the high cam surface 190 of the cam 187 is moved under the roller 191, raising the follower 168 and forcing downward movement of the arm 172 and of the button 174. This compresses the speeder spring 143 in the manner previously described in detail, allowing full communication between the pressure line 120 and the pipe 150. Since the pipe 150 is now connected through the reversing valve to the front end of the propeller cylinder (the annular space 52) pitch decreasing movement of the propeller blade is enforced at a high rate of pitch change. Propeller blade pitch will pass through zero to the negative pitch region at high rate until the negative pitch limit is reached. This limit is established by a cam knee 227 on the cylinder 161 which, as previously described, rotates in accordance with the position of the annular piston 51 and the propeller pitch changing mechanism. The knee 227, as the cylinder 161 rotates, engages a leftward projection 228 of the pawl 223, raising said pawl from the dog 222 and allowing the finger 184 to resume its normal horizontal position. This restores the roller 191 of the follower 168 to the low point on the cam 187, allowing the speeder spring 143 to expand and to resume its normal function. Fig. 7 shows the system after the reverse limit stop has been reached wherein the control of propeller pitch has been returned to the governor. The governor will now control the speed of the propeller by adjusting pitch, in the reverse sense, to maintain constant engine speed.

During this reverse pitch operation, the pump 116 and the accumulator 123 serve in their normal fashion to provide pressure fluid to the line 120, and the governor valve 141 will move in response to governor action and speeder spring force to adjust propeller pitch. The cam 167a on the cylinder 161 provides, as shown in Fig. 7, a low negative pitch limit stop, operating in exactly the same way as this cam operates for low positive pitch limiting. High negative pitch is limited by the piston 51 mechanically abutting the rear of the propeller actuating cylinder.

When it is desired to return from reverse pitch operation to normal operation, the control 178 is moved to the normal position (N). This action swings the disc segment 182 counterclockwise from the Fig. 7 position through about 90 degrees to the position shown in Fig. 5. The pin 215 on the disc 182 swings the plate 217 and restores the reversing valve rotor 219 to the position of Fig. 5, thereby establishing communication from the governor valve port 149 through the pipe 154 to the annular space 52 in the front end of the propeller piston, and establishing communication from the governor valve port 150 through the pipe 152 to the annular space 53 at the rear end of the propeller cylinder. Concurrently, the projection 221 on the disc 182 moves downwardly, engaging the finger 184 and moving it downwardly and clockwise to about 45 degrees below the horizontal. This turns a dog 232 to allow a pawl 233 to engage the end of the dog and to hold the finger 184 and its associated parts in the clockwise tilted position. In the meanwhile, the projection 221 has passed beyond the finger 184 to the position of Fig. 5. With the finger 184 tilted downwardly, the roller 191 of the follower 168 has been raised to the high point 189 of the cam 187. This has the same action as previously described in compressing the speeder spring 143 and in allowing virtually full opening of the port 150 in the governor valve so that pressure fluid may flow from the line 120 through the lines 150 and 152 to the annular space 53, urging propeller pitch increase in a positive direction at the high rate of pitch change previously described in connection with the feathering cycle. As the propeller blades reach a pitch position within the governing range, a cam knee 235 on the cylinder 161 comes into contact with an extension 236 of the pawl 233, raising said pawl from the dog 232 and allowing the finger 184 to resume its normal horizontal position. Thereupon, the roller 191 of the follower 168 drops to the low point of the cam 187 and control of propeller pitch is returned to the flyweight governor and the speeder spring 143. As indicated previously, the cylinder 161 moves in response to position of the propeller piston 51. It is preferred to fit the cam knee 235 on the cylinder 161 at such a position that unreversing of the propeller will terminate within the normal governing range. This assures faster restoration of the system to normal governing action than is afforded when the terminal of unreversing is at the normal low pitch stop. The propeller pitch can then readjust itself from the terminal position of unreversing either toward high pitch or low pitch as the governor may demand. In the case of installations for dive braking, the unreversing terminal position will be toward the high pitch end of the normal governing range to minimize overspeeding tendencies; for ground braking, such terminal position will be toward the low pitch end of normal governing in preparation for full power takeoff. The several cam elements 167, 227 and 235 are relatively angularly adjustable on the cylinder 161, so that changes may be made in the limit positions as desired.

While the specific cycles of propeller operation have been described above in conjunction with the various mechanisms, a summary will be given of some of the more outstanding and significant points which flow from the practice of this invention. Save for the simple reversing valve 151, the relatively standardized unloader system 119 and the accumulator shut-off valve 122, all control of the hydraulic fluid for all of the various regimes of operation of the propeller are concentrated in the governor valve 121. While this valve under ordinary circumstances is controlled purely by the propeller governor flyweight and the speeder spring 143, it is biased by the mechanisms controlling different regimes of operation to yield both a low rate of pitch change proportional to the off-speed condition and a high uniform rate of pitch change for feathering, reversing and return from reverse. This not only simplifies the hydraulic system materially but has the attendant advantage of reducing potential sources of fluid leakage. In other hydraulic control propeller systems known in the art, a large number of valves are required to alter fluid circuits in such fashion that high and low rate pitch change may be accomplished. Virtually all of the control mechanisms shown in Figs. 5, 6 and 7 are, physically, incorporated in the stationary housing 55 secured to the rear portion of the propeller. Exemplary of this, Fig. 4 shows the disposition of the flyweight system in said housing. The oil sump mentioned heretofore, while not shown, is merely an appropriate cavity located in the stationary housing 55. The only part of the system not incorporated in the propeller or in the stationary housing 55 is the speeder spring adjustment involving the control 147, and the function control for feather, normal and reverse pitch operation involving the control 178. The housing 55 may contain additional apparatus, or some of the apparatus described may be replaced, to provide special control functions needed in connection with different types of prime movers such as conventional engines or turbines, and may further be modified to include synchronizing equipment used for multi-propeller or multi-engine installations in the aircraft.

Though but a single embodiment illustrating the invention has been illustrated and described, it is to be understood that the invention may be applied in various forms. Changes may be made without departing from the spirit of the invention as will be apparent to those skilled in the art, and reference should be made to the appended claims for a definition of the limits of the invention.

What is claimed is:

1. In a propeller for aircraft having a hub and blades journalled in said hub for pitch change, a rearward cylindrical extension on said hub, a plate at the forward end of said extension secured to said hub, a cylinder coaxial with said extension and defining therewith an annular cylindrical chamber, the rearward end having a closure in rotary sealing relationship with a rearward portion of said extension, a rotary seal between the forward end of said cylinder and said plate, means to hold said extension and cylinder in axially fixed relation while allowing relative rotation therebetween, a unitary annular piston slidable in an axial direction within said annular chamber and having sliding sealing engagement with said extension and rotatable and sliding sealing engagement with said cylinder, a plurality of driving means connecting said piston with the blades of said propeller comprising rods secured to the piston and passing through said plate and hub whereby axial piston movements cause pitch changing blade movements in said hub, and means wholly carried by said cylinder to admit hydraulic fluid to the ends of said cylinder for moving the piston in an axial direction therein, said last named means comprising a governor driven by the hub having a fluid regulating valve and means to overcontrol said governor valve responsive to the position of said piston with respect to said cylinder.

2. In a controllable pitch propeller comprising a hub and blades mounted therein, a pitch changing motor comprising a piston rotatable with the propeller, a stationary cylinder within which said piston is slidable, means mounted on said cylinder but movable by said piston, whose movement is a function of blade pitch angle, pitch limit stops for low pitch, feathering and reverse pitch, and means responsive to said movable means to control said low pitch, feathering and reverse pitch limit stops.

3. In a propeller for aircraft comprising blades journalled in a hub, said hub including a coaxial cylindrical portion, a non-rotating cylinder embracing said portion, means providing a rotating seal between each end of said cylinder and the ends of said portion, said means providing closures at the ends of said cylinder, an annular piston within the cylinder embracing said cylindrical portion and slidable therealong, said piston being rotatable with said cylindrical portion and having rotating clearance with the wall of said cylinder to allow of relative rotation therewith, rotating seal means disposed on the rim of said piston engaging the wall of said cylinder to afford a fluid seal between the piston and cylinder, a plurality of rods secured to said piston and passing through the hub for connecting said piston with said blades whereby axial piston movement imparts pitch changing movement to said blades, fluid supply pressurizing and control mechanism carried by said cylinder, means controllably operative to direct pressurized fluid from said mechanism to one end or the other of said cylinder to move said piston axially within said cylinder, a pivot secured in one end of said cylinder in a substantially radial direction, a flat metallic strap secured at one end to said pivot within said cylinder and having at its other end a shoe slidably engaging said piston, said strap transmitting axial piston movement to turn said pivot and being free to bend as the distance between the piston and the pivot varies with changes in the axial position of the piston, and a connection between said pivot, externally of the cylinder, and said control mechanism to control fluid flow to the cylinder in response to certain positions of said piston.

4. In a controllable pitch propeller comprising a hub and blades mounted therein, a pitch changing motor comprising a piston rotatable with the propeller and connected with the blades and a non-rotating cylinder within which said piston is axially slidable, a hydraulic system connected to the cylinder operable to move said piston therein, means turnably mounted in the wall of said cylinder having a portion engaged by said piston, whereby said means is turned in accordance with the axial position of said piston in the cylinder, a pitch limit stop element carried by said means and movable therewith, and a control device engageable with and actuatable by said element and controllably connected to said hydraulic system to control operation of said hydraulic system upon engagement of said element with said control device.

5. In a controllable pitch propeller comprising a hub and blades mounted therein, a pitch changing motor comprising a piston connected with the blades and a non-rotating cylinder within which said piston is axially slidable, a hydraulic system connected to the cylinder and operable to move the piston therein, a member journalled in the cylinder wall having an elastic strip secured thereto, said strip including a portion engaged and movable with the piston, whereby said member is rotated in accordance with the axial position of said piston, a pitch limit stop element carried by said member and movable therewith, and a control device engageable with and actuatable by said element and controllably connected to said hydraulic system to control operation of said hydraulic system upon engagement of said element with said control device.

MAURICE E. CUSHMAN.

References Cited in the file of this patent

UNITED STATES PATENTS

| Number | Name | Date |
|---|---|---|
| 1,905,133 | Bishop et al. | Apr. 25, 1933 |
| 2,214,816 | Harrington | Sept. 17, 1940 |
| 2,216,416 | Mader | Oct. 1, 1940 |
| 2,241,665 | Herman | May 13, 1941 |
| 2,275,963 | Herman et al. | Mar. 10, 1942 |
| 2,307,849 | Mullen | Jan. 12, 1943 |
| 2,320,195 | Rindfleisch | May 25, 1943 |
| 2,337,613 | Martin | Dec. 28, 1943 |
| 2,353,566 | Keller | July 11, 1944 |
| 2,353,773 | Unterburg | July 18, 1944 |
| 2,364,672 | Stevenson | Dec. 12, 1944 |
| 2,377,386 | Stalker | June 5, 1945 |
| 2,378,558 | Kalin | June 19, 1945 |
| 2,391,629 | Keller | Dec. 25, 1945 |
| 2,391,699 | Haines et al. | Dec. 25, 1945 |
| 2,394,846 | Cox | Feb. 12, 1946 |
| 2,398,713 | Martin | Apr. 16, 1946 |
| 2,400,418 | Hofbauer | May 14, 1946 |
| 2,423,191 | Kopp | July 1, 1947 |
| 2,424,749 | Haines | July 29, 1947 |
| 2,425,261 | Murphy et al. | Aug. 5, 1947 |
| 2,435,080 | Hoover | Jan. 27, 1948 |
| 2,460,559 | Wildhaber | Feb. 1, 1949 |
| 2,505,206 | Richardson et al. | Apr. 25, 1950 |

FOREIGN PATENTS

| Number | Country | Date |
|---|---|---|
| 360,040 | Italy | June 10, 1938 |
| 519,261 | Great Britain | Mar. 20, 1940 |
| 560,522 | Great Britain | Apr. 6, 1944 |